United States Patent [19]
Bruehl et al.

[11] Patent Number: 5,597,049
[45] Date of Patent: Jan. 28, 1997

[54] RACK-AND-PINION STEERING SYSTEM MOUNTING

[75] Inventors: Hubert Bruehl, Waldstetten; Harald Schwer, Ulm-Eggingen, both of Germany

[73] Assignee: Mercedes-Benz AG, Germany

[21] Appl. No.: 425,623

[22] Filed: Apr. 20, 1995

[30] Foreign Application Priority Data

Apr. 22, 1994 [DE] Germany .................... 44 14 020.7

[51] Int. Cl.⁶ .................... B62D 3/00; F16F 1/387
[52] U.S. Cl. .................... 180/400; 180/428; 180/434; 267/141.3
[58] Field of Search .................... 280/89, 90, 96.1; 267/141.2, 141.3, 141.4, 141.5; 180/400, 428, 434

[56] References Cited

U.S. PATENT DOCUMENTS

| | | | |
|---|---|---|---|
| 3,951,477 | 4/1976 | Townshend | 267/141.2 X |
| 4,002,327 | 1/1977 | Damon | 267/141.4 X |
| 4,087,103 | 5/1978 | Smith | 280/662 X |
| 5,192,100 | 3/1993 | Rumpel et al. | 280/668 |

FOREIGN PATENT DOCUMENTS

| | | |
|---|---|---|
| 0107781B1 | 4/1987 | European Pat. Off. . |
| 0351146A2 | 1/1990 | European Pat. Off. . |
| 2421498B2 | 11/1975 | Germany . |
| 3118177A1 | 11/1982 | Germany . |
| 3425730A1 | 1/1986 | Germany . |
| 3704412A1 | 8/1987 | Germany . |
| 1506209 | 4/1978 | United Kingdom . |

OTHER PUBLICATIONS

Fahrwerktechnik: Lenkung, Jörnsen Reimpell, Vogel-Buchverlag Würzburg, 1984, 2 pages.

*Primary Examiner*—Brian L. Johnson
*Assistant Examiner*—Victor E. Johnson
*Attorney, Agent, or Firm*—Evenson, McKeown, Edwards & Lenahan P.L.L.C.

[57] ABSTRACT

An axial mounting of a rack-and-pinion steering system takes transverse forces and, at the same time, permits a defined resilience of the rack mounting in the transverse direction of the vehicle for affecting steering behavior of the vehicle and, in particular, permitting desired understeer during cornering. Mountings of this kind are particularly applicable to passenger vehicles in which the track rods are arranged behind the steered axle in the direction of travel. The rack-and-pinion steering system is mounted by two bearings arranged upright and at a relatively great distance from one another at the ends of the steering gear casing. The bearing bodies are either V-shaped or Y-shaped as viewed in longitudinal section. One upper and one lower bearing body together with damping elements are in each case arranged symmetrically and in alignment with one another in the top and bottom parts respectively of the bearing guide, with the smaller end faces of the V-shaped or Y-shaped bearing bodies facing one another. The upright arrangement of the bearing bodies with damping elements subjects the damping elements axially to compressive stress and also to shear stress. A desired stiffness and spring hardness in the vertical and longitudinal directions of the vehicle are thereby achieved.

10 Claims, 5 Drawing Sheets

RACK-AND-PINION STEERING SYSTEM MOUNTING

BACKGROUND AND SUMMARY OF THE INVENTION

The present invention relates to a mounting of a rack-and-pinion steering system for motor vehicles and, more particularly to a mounting for passenger motor vehicles in which the track rods are arranged behind the axle in the direction of travel and in which a defined resilience of the rack mounting in the transverse direction of the vehicle is of particular importance to the behavior of the steering system.

The simplest form of a rack-and-pinion steering system of a motor vehicle is fastened by rigid bolting to frame or body parts, such as the front cross-member or the front bulkhead. In order to take vibrations and shocks transmitted via the wheels and wheel suspensions, elastic mountings for the rack-and-pinion steering system are used.

According to REIMPELL, Fahrwerktechnik-Lenkung, [translated: Running-gear technology—steering], Vogel-Verlag, 1984, mounting arrangements are known in which the rack-and-pinion steering system is elastically connected to the vehicle frame by a tubular damping rubber. A spacer tube integrated into the damping rubber prevents compression of the rubber body and also limits axial compressive stresses.

In, another known form, the casing of the rack-and-pinion steering system is almost completely surrounded by an elastomer body which is screwed into nonpositive engagement with the vehicle frame by fastening clips which engage therearound. The thick-walled elastomer body permits movements of the rack-and-pinion steering system in all three main spatial directions. This resilience of the steering system is however, undesirable, particularly in the longitudinal or travel direction of the vehicle and in a vertical direction because it leads to instability of the vehicle.

In addition, this known configuration involves considerable space requirements and, particularly in passenger motor vehicles, leads to design problems in the arrangement of the steering gear in the available region between the engine/gearbox unit and the stabilizer, taking into account the necessary ground clearance of the vehicle. Furthermore, an undesirable slewing or torsion movement of the rack-and-pinion steering system about its longitudinal axis is not completely prevented by the positive clip connection.

DE 37 04 412 shows a steering gear fastening having a plurality of shaped elastomer bodies which consist of a single part or two parts. The bodies are arranged in the longitudinal direction of the rack-and-pinion steering system. The identically shaped, homogeneous elastomer bodies enable only transverse forces to be absorbed. Similarly, a wheel suspension for steerable front wheels of a motor vehicle shown in DE 31 18 177 has a plurality of spaced shaped rubber parts which are arranged on the cross strut of the steering gear.

In DE 24 21 498, a U-shaped elastomer body is described and, with the aid of a peripheral tension band, permits slight axial movability of the rack-and-pinion steering system. This arrangement does not, however, permit automated installation of the completed rack-and-pinion steering system on the vehicle.

EP 0 351 146 shows a rack mounting which consists of a plurality of "silentblocs" in the form of hollow cylinders. This embodiment permits only slight resilience in the transverse direction of the vehicle, and thus does not allow the deflection of the mounted rack-and-pinion steering system which is necessary for under-steer of the vehicle.

EP 0 107 781 describes a plurality of asymmetrically () shaped multipart elastomer mounting bodies for the elastic mounting of a rack-and-pinion steering system. The spring elements subjected to compressive or shear stresses have a substantially annular shape. The elastomer parts, which together form a movable bearing and a fixed bearing, are connected to the vehicle body by holding straps gripping around, them. This mounting arrangement requires considerable space and does not permit automated installation on the complete assembly on the vehicle.

DE 34 25 730 shows a wheel suspension for a rear axle carrying steerable wheels and has a total of four asymmetrically arranged profiled rubber bodies spaced apart from one another. Two mountings arranged horizontally in the direction of travel serve to take longitudinal forces, while the two silentblocs arranged transversely to them take the resultant transverse forces acting on the co-steering rear axle. This known construction, which is expensive with respect to design and installation techniques, likewise does not permit automated final installation of the completed vehicle steering system.

An object of the present invention is to provide a mounting for a rack-and-pinion steering system which, through a tautly seated steering system, ensures stable guiding of the vehicle in the travel direction to prevent the dreaded "wandering" of the vehicle.

Transversely to the direction of travel, that is in the longitudinal direction of the rack-and-pinion steering system, limited elasticity of the mounting construction is required, in order to ensure the desired understeer of the vehicle during cornering. In addition, when the track rods are inclined in relation to the axis of the rack during deflection and rebound movements, the suspension of the rack-and-pinion steering system should intercept obliquely directed forces such that tilting of the rack about the vehicle longitudinal axis and also twisting about its own axis are largely avoided. Moreover, the rack-and-pinion steering system of the present invention is now installable automatically on the vehicle from below.

The object of the present invention has been achieved by providing that the two bearing guides arranged upright in longitudinal and transverse directions of the motor vehicle and spaced apart in the longitudinal direction of the steering gear and connected to a casing of the steering gear. In the bearing guide, two bearing bodies tapering towards the center of the respective bearing guide are aligned with one another in a mirror image arrangement. The bearing bodies have through-holes in a longitudinal direction of the bearing guide, and a damping element is arranged on the outer periphery of the bearing body. A wall thickness of the damping element in the longitudinal direction of the motor vehicle is greater than a wall thickness in the transverse direction of the motor vehicle. An inner wall of the bearing guide is shaped in accordance with an external contour of the bearing bodies with damping elements, and opposing bearing bodies, with the associated damping elements, are clamped axially together with a defined initial stress when installed in the bearing guide.

The rack-and-pinion steering system is mounted by two bearings which are arranged upright and at a relatively great distance from one another at the ends of the steering gear casing. The two bearings consist essentially of the bearing holder which is joined to the steering gear and of two bearing bodies having damping elements. The bearing bodies are V-shaped or Y-shaped in longitudinal section and have axial through holes for the passage of the clamp bolts. One upper and one lower bearing body together with damping elements are arranged symmetrically and in alignment with one another in the top and bottom pares respectively of the bearing guide. The smaller end faces of the V-shaped or Y-shaped bearing bodies face one another.

Through the upright arrangement of the bearing bodies with their damping elements, the latter are subjected axially to compressive stress and at the same time also to shear stress. Thus, the desired great stiffness and spring hardness in the vertical direction and also in the longitudinal direction of the vehicle are achieved.

The softness of the bearings in the transverse direction of the vehicle is achieved through the fact that the damping elements of the bearings are provided on their periphery, in the longitudinal direction of the steering gear, with depressions or flats on one side or diametrically opposite on both sides. A damping element flattened on both sides in the transverse direction of the vehicle is shown in FIG. 2 where the bearing gap on both sides in the transverse direction of the vehicle in the static state can be clearly seen. During cornering, this configuration permits soft deflection of the rack-and-pinion steering system. With correspondingly great forces the damping element makes contact over its entire surface with the inner wall of the bearing guide and is automatically centered by the bearing guide. Because of the greater spring hardness, further swinging-out of the rack-and-pinion steering system in the transverse direction of the vehicle is prevented.

Flattening of the damping element on one side is likewise shown solely by way of example in FIGS. 7 and 8. Using, on both sides, this kind of damping element, which has outwardly directed flats, in both the bearings brings about an initially steeper rise of the characteristic line of the spring force in the transverse direction of the vehicle. After a short spring travel, the lifting-off of the unloaded side produces a flat pattern of spring force over the spring travel, with a nearly linear rise.

This spring characteristic at first causes around the middle position a better stability of the vehicle and gives the driver the impression of driving with steering stability. Only when transverse forces become greater does the soft spring characteristic of the damping elements then occur, thus permitting the desired understeer of the vehicle. The V-shaped or Y-shaped configuration of the bearings offers the further advantage that obliquely directed supporting forces, which act on the steering gear via the track rods, are more effectively introduced.

Effective supporting of the rack-and-pinion steering system against tilting about the longitudinal axis of the vehicle is achieved through a large support base, in that in an advantageous embodiment the two bearings are arranged at a correspondingly great distance from one another on one longitudinal side of the rack casing.

In order to automate the installation of the rack-and-pinion steering system on the vehicle, the steering system is mounted on a mounting member, which in a preferred embodiment is in the form of a substantially C-shaped, beaded metal sheet. The mounting member receives the entire unit and is brought from below against the vehicle body. The bearings are taken to mounting holes in a cross-member and then bolted to the latter. This mounting bolting achieves at the same time the desired axial initial stress of the one-piece elastomer bodies which are preferably used damping elements for the two bearings in order to adjust the desired bearing hardnesses of the latter.

According to another aspect of the present invention, the bearing body is in the form of a truncated cone which is provided with a through hole and has a V-shape in longitudinal section. Through the mirror-image arrangement of two V-shaped bearing bodies aligned with one another, whose smaller end faces lie opposite one another, extremely small overall heights of the bearings can be achieved. In addition, because of their simple shape the bearing bodies are easy to produce in terms of the manufacturing technology involved.

In another aspect of the present invention, the bearing body is in the form of a truncated cone which is provided with a through hole and has a Y-shape in longitudinal section and which is provided with a hollow cylindrical extension on its smaller end face. The mirror-image arrangement of two Y-shaped bearing bodies lying with their smaller end faces aligned opposite one another offers the advantage that obliquely directed reaction forces on the steering gear, which forces occur in particular in the event of a large angle of lock (cornering, manoeuvering), can be dependably absorbed.

In an advantageous embodiment of the present invention, the damping element is in the form of a one-piece elastomer body which can be produced in a simple manner and is joined to the bearing body by elastic initial stress. Alternatively, the damping element is vulcanized to the bearing body.

In a currently preferred embodiment, the damping element is shaped to form on its periphery or end face a sealing lip which, in the installed state, is applied with a positive fit to the bearing guide and forms a dustproof covering for the bearing interior.

In order to ensure great bearing stability of the rack-and-pinion steering system in relation to tilting movements transversely to the longitudinal direction of the vehicle, the two bearings are arranged at the outer-most end points of the steering gear casing. When the steering gear casing is constructed in the form of a pressure diecasting, the bearing guides can in a simple manner be integrated into the wall of the casing.

To ensure automated installation of the steering system use is made of a mounting member which receives the preassembled rack-and-pinion steering system and, in an advantageous development is at the same time configured to protect the steering system against thrown-up stones and as underclearance protection.

It is particularly advantageous that the solution provided by the present invention makes possible achievement of a defined spring characteristic of the steering arrangement in the x-, y- and z-directions. This is accomplished through the different configuration of the bearing bodies and damping elements in conjunction with the adjustable initial stress of the spring system in the installation of the unit.

In addition, the arrangement of the present invention offers the advantage that, particularly on the rebound of the vehicle or with a large lock angle, the geometrically defined position of the steering gear relative to the other elements of the steering arrangement is retained. This results from the greater spring hardness in the x- and y-directions which prevents deflection of the rack-and-pinion steering system, whereas in the y-direction a defined deflection can occur. Because of the arrangement selected, however, torsion of the rack-and-pinion steering system about the y-axis is impossible.

BRIEF DESCRIPTION OF THE DRAWINGS

These and other objects, features and advantages of the present invention will become more readily understandable from the following detailed description when taken in conjunction with the accompanying drawings wherein.

DETAILED DESCRIPTION OF THE DRAWINGS

Figure 1:
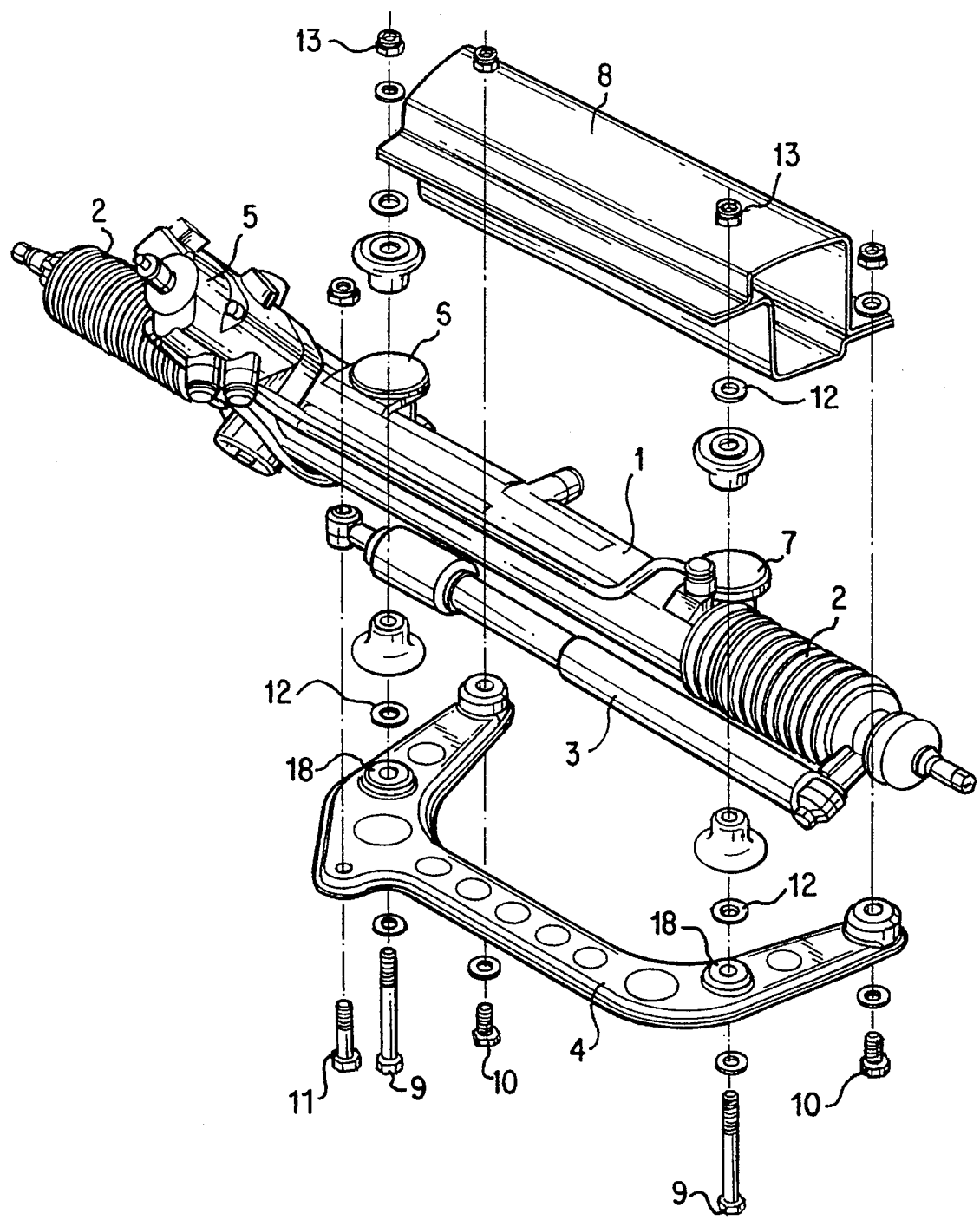
FIG. 1 is a perspective exploded view of a steering gear mounting in accordance with the present invention in a passenger motor vehicle.

FIG. 1 shows in an exploded view the most essential elements of the steering gear of a passenger motor vehicle. The tubular steering gear casing 1 surrounds the rack (not shown in detail), which on axial deflection is protected by the steering system sleeves 2. Two bearings 6 and 7 are lid situated at the outer ends of the steering gear casing 1. The steering movements are transmitted in a known manner via the steering wheel (not shown) and the steering column to the pinion in the pinion casing 5 and the rack. A steering damper 3 serves for additional stabilization of steering behavior.

The steering gear casing 1 is received on a C-shaped mounting member 4 in preassembling the unit. The mounting member 4 is a sheet metal pressing and has two through holes 18 which are in alignment with the centers of the bearings 6, 7. The steering gear is fastened to a cross-member 8 arranged above by two clamp bolts 9, so that the mounting member 4, together with the steering gear casing 1, is bolted to the cross-member 8 and, at the same time, the desired initial stress of the two bearings is adjusted thereby. The upper and lower bearing bodies 15 arranged in the bearing guide 14, together with the damping elements 16, are axially clamped, whereby the bearing bodies 15 (FIG. 2) are supported in the inner wall of the bearing guide 14.

Figure 2:
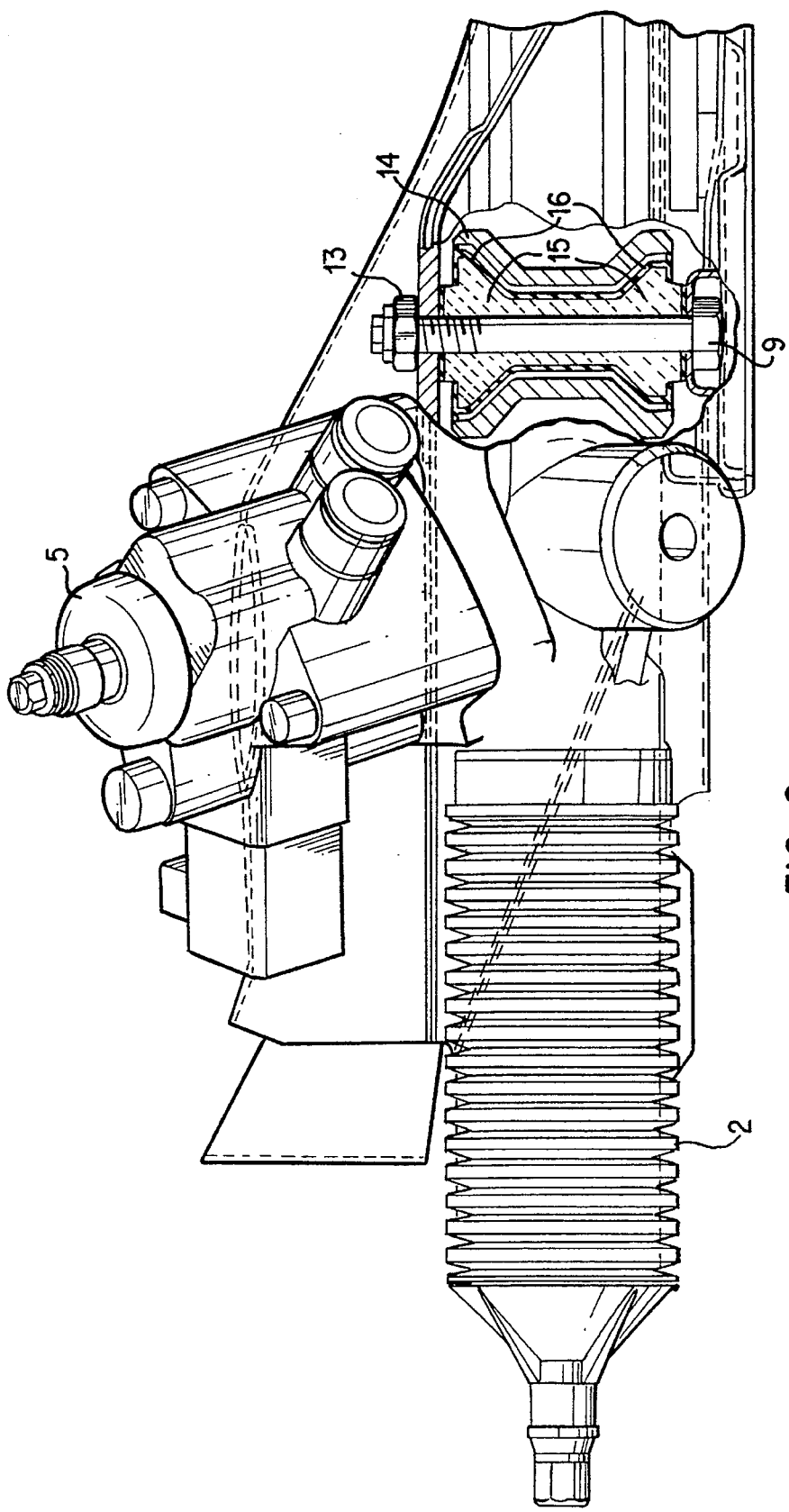
FIG. 2 is a partial cross-sectional side view of a part of the tubular steering gear casing with the bearing in the transverse direction of the vehicle.

The bearing shown in a sectional view in FIG. 2 in the transverse direction of the vehicle shows the bearing gap between the inner wall of the bearing guide 14 and the bearing body 15 with the damping element 16. Automatic installation of the completed unit from a position below the vehicle is achieved by the aligned positioning of the mounting member 4 with the steering gear casing 1 arranged thereon. Securing in position and, at the same time, adjusting of the axial initial stress of the bearings are effected by way of the clamp bolt 9 in conjunction with a nut 13 arranged on the cross-member 8.

Through the upright arrangement of the bearing bodies 15 with their damping elements 16, the latter are subjected axially to compressive stress and at the same time also to shear stress. Thus, the desired great stiffness and spring hardness in the vertical direction and also in the longitudinal direction of the vehicle are achieved.

The softness of the bearings in the transverse direction of the vehicle is achieved through the fact that the damping elements 16 of the bearings 6, 7 are provided on their periphery, in the longitudinal direction of the steering gear, with depressions or flats on one side or diametrically opposite on both sides. A damping element 16 flattened on both sides in the transverse direction of the vehicle is shown in FIG. 2 where the bearing gap BG on both sides in the transverse direction of the vehicle in the static state can be clearly seen. During cornering, this configuration permits soft deflection of the rack-and-pinion steering system. With correspondingly great forces the damping element 16 makes contact over its entire surface with the inner wall of the bearing guide 14 and is automatically centered by the bearing guide. Because of the greater spring hardness further swinging-out of the rack-and-pinion steering system in the transverse direction of the vehicle is prevented.

This spring characteristic at first causes around the middle position a better stability of the vehicle and gives the driver the impression of driving with steering stability. Only when transverse forces become greater does the soft spring characteristic of the damping elements then occur, thus permitting the desired understeer of the vehicle. The V-shaped or Y-shaped configuration of the bearings offers the further advantage that obliquely directed supporting forces, which act on the steering gear via the track rods, are more effectively introduced.

Figure 3:
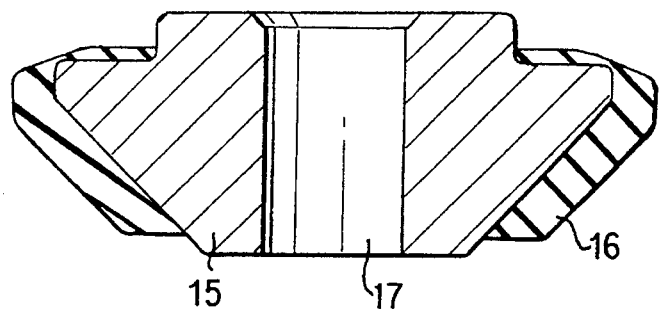
FIG. 3 is a cross-sectional view of a V-shaped bearing body along the longitudinal direction of the vehicle.
Figure 4:
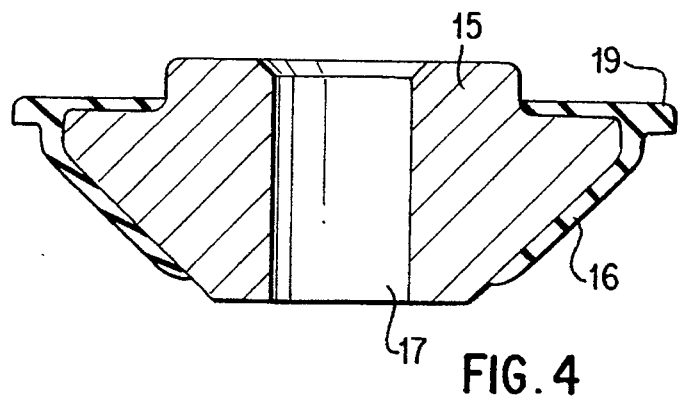
FIG. 4 is a cross-sectional view of a V-shaped bearing body in the transverse direction of the vehicle.

FIGS. 3 to 6 show preferred embodiments of the bearing body 15 and damping element 16. FIGS. 3 and 4 show a substantially V-shaped bearing body 15 which has a short cylindrical extension on which the clamp bolt 9 is supported with the aid of a washer 12. The central through hole 17 is cylindrically shaped and the clamp bolt 9 extends therethrough. Two identical bearing bodies 15 with damping elements 16 are disposed in a mirror image arrangement, with the smaller end faces towards one another, in the bearing guide 14 and clamped against each other by the clamp bolt 9, washer 12 and nut 13. The wall thickness of the damping element 16 is at its maximum in the longitudinal direction of the vehicle. On the clamping of the bearing bodies 15 relative to the bearing guide 14 a firm press fit is thereby achieved in the longitudinal direction of the vehicle and in the vertical direction. In contrast thereto, in the transverse direction of the vehicle the damping element 16 according to FIG. 4 has a distinct reduction of wall thickness. Through this bearing play an elastic deflection of the steering gear in the transverse direction of the vehicle is obtainable. A peripheral sealing lip 19 protects the interior of the bearing against penetration of particles of dirt. An advantage of the V-shape of the bearing body 15 is the extremely short overall height of the entire bearing. Through this structural shape and the bearings 6, 7 arranged directly next to the steering gear casing 1 the available ground clearance of the vehicle is not restricted.

Figure 5:
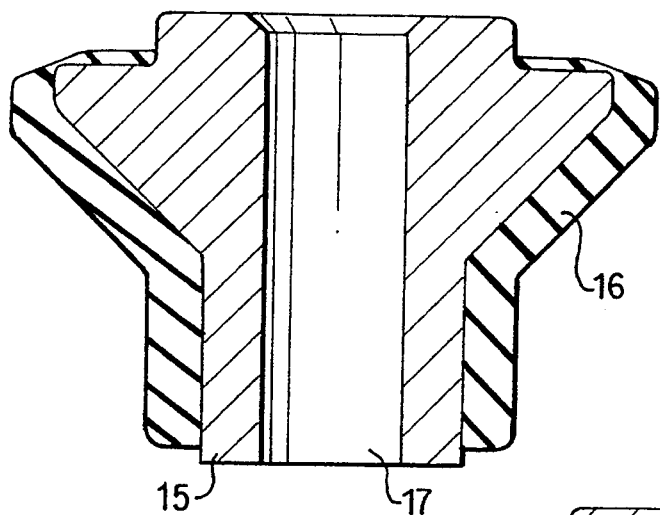
FIG. 5 is a cross-sectional view of a Y-shaped bearing body along the longitudinal direction of the vehicle.
Figure 6:
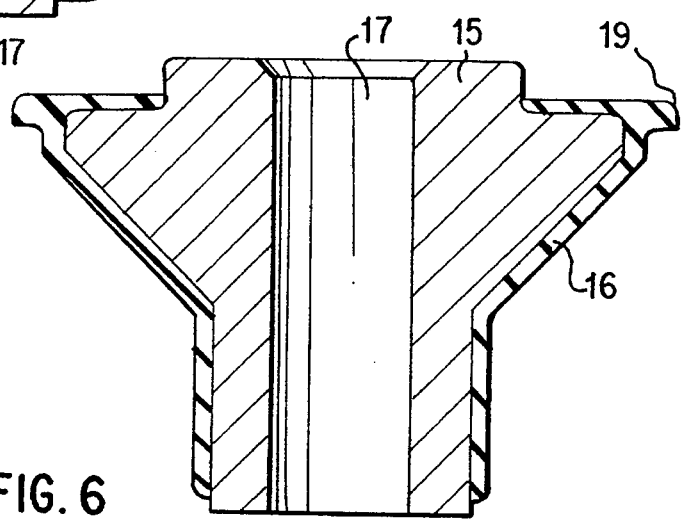
FIG. 6 is a cross-sectional view of a Y-shaped bearing body in the transverse direction of the vehicle.

In FIGS. 5 and 6, another preferred configuration is shown which consists of a Y-shaped bearing body 15 with a damping element 16 vulcanized thereto. Just as in FIGS. 3 and 4, the reduction of the wall thickness of the damping element 16 in the transverse direction of the vehicle serves to achieve an elastic deflection of the steering gear and therefore the desired understeer of the vehicle during cornering. In contrast thereto, the wall thickness of the damping element 16 is constant in the longitudinal direction of the vehicle. For dependable absorption of obliquely acting reaction forces which are transmitted via the track rods to the steering gear, the upper part of the Y-shaped bearing body 15 has an angle of inclination of 45° relative to the adjoining cylindrical part. The bearing bodies 15 are advantageously made of an aluminum-magnesium alloy. The one-piece damping element 16 consists of an elastomer.

Figures 7, 8:
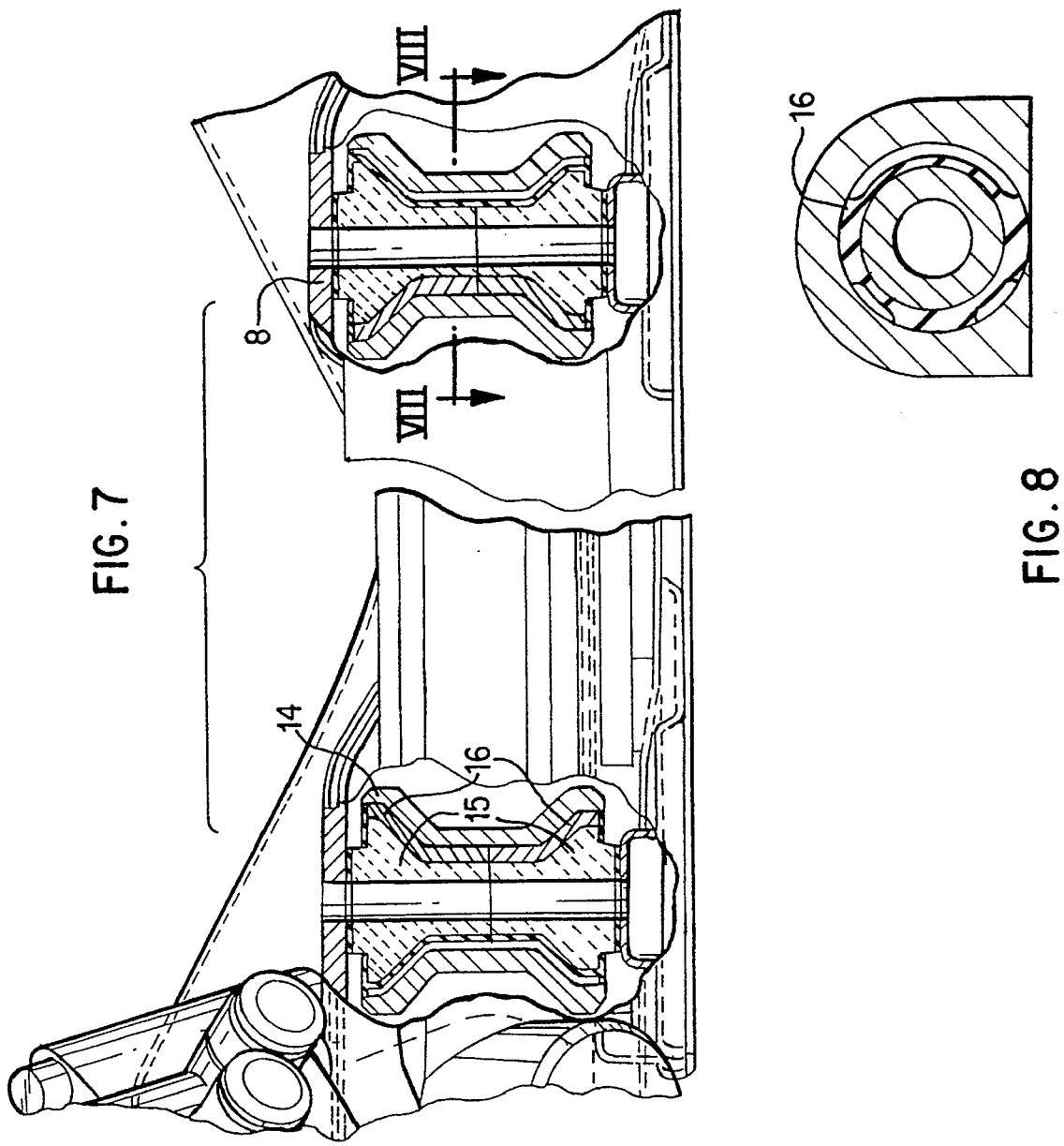
FIG. 7 is a cross-sectional view of a part of the cross-member with a section of the bearings according to a currently preferred embodiment.
FIG. 8 is a sectional view along line VIII—VIII of FIG. 7.
Figure 9:
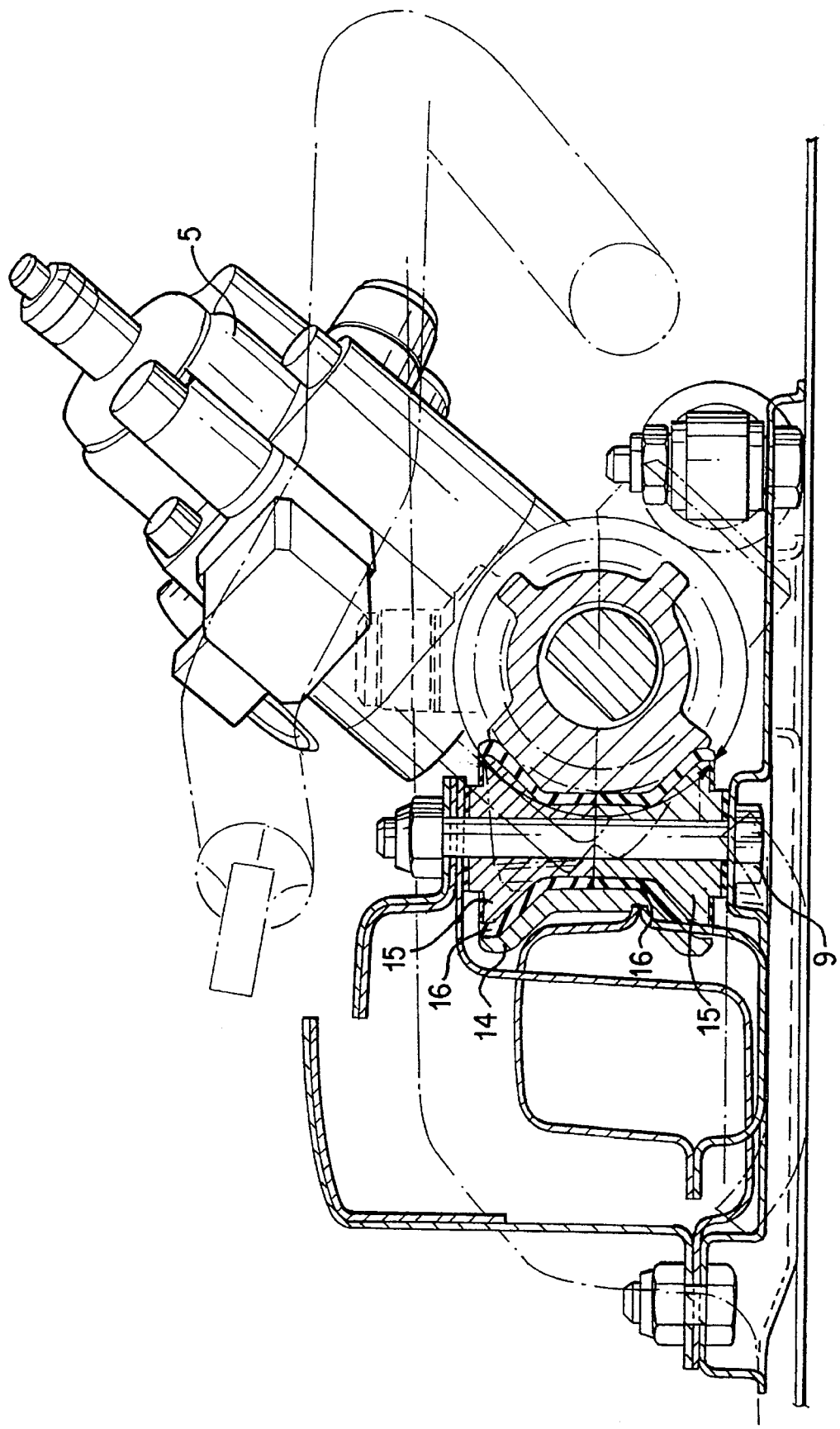
FIG. 9 is a partial cross-sectional view of a part of the steering gear with a sectional view of the bearing in the longitudinal direction of the vehicle.

In FIG. 7, the bearings 6, 7 mounted on the cross-member 8 are shown assembled together. FIG. 8 shows in a sectional view the different configuration of the wall thickness of the damping element 16 in the longitudinal and transverse directions of the vehicle in accordance with FIG. 7. FIG. 9 shows in comparison with FIG. 2, where the wall of the damping element is thinner in the transverse direction, a part of the steering gear mounting with a section through the bearing in the longitudinal direction of the vehicle with the wall of the damping element 16 being thicker in that direction.

Flattening of the damping element on one side is likewise shown solely by way of example in FIGS. 7 and 8. Using, on both sides, this kind of damping element (16), which has outwardly directed flats, in both the bearings (6) and (7) brings about an initially steeper rise of the characteristic line of the spring force in the transverse direction of the vehicle. After a short spring travel the lifting-off of the unloaded side produces a flat pattern of spring force over the spring travel, with a nearly linear rise.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A mounting of a rack-and-pinion steering system including a steering gear for a motor vehicle, comprising two elastic bearings having two spaced-apart bearing guides arranged upright in a direction perpendicular to longitudinal and transverse directions of the motor vehicle and connected to casing of the steering gear, wherein, in the bearing guide, upper and lower bearing bodies tapering towards a center of the respective bearing guide are aligned with one another in a symmetrical arrangement, each of the bearing bodies have through-holes in a longitudinal direction of the bearing guide, a damping element is arranged on an inner surface of an outer wall of the bearing body, a wall thickness of the damping element in the longitudinal direction of the motor vehicle being greater than a wall thickness of the damping element in the transverse direction of the motor vehicle, an inner wall of the bearing guide is shaped to match an external contour of the respective bearing bodies which are clamped axially together with a defined initial stress when installed in the bearing guide.

2. The mounting according to claim 1, wherein the bearing body tapering on one side is configured as a V-shaped truncated cone.

3. The mounting according to claim 1, wherein the bearing body tapering on one side is configured as a Y-shaped truncated cone, a hollow cylindrical extension on a smaller end face thereof.

4. The mounting according to claim 1, wherein the damping element is a one-piece elastomer body.

5. The mounting according to claim 1, wherein the damping element is vulcanized to the bearing body.

6. The mounting according to claim 1, wherein the damping element has in the transverse direction of the vehicle at least one peripheral depression or flat, and in the installed state the peripheral depressions or flats of the respective damping elements of the two bearings lie diametrically opposite one another.

7. The mounting according to claim 1, wherein the damping element has on an end face thereof a sealing lip shaped to make a positive fit with the bearing guide to protect against bearing soiling.

8. The mounting according to claim 1, wherein the bearing guides are arranged at outer ends of a longitudinal side of the steering gear casing.

9. The mounting according to claim 1, wherein the rack-and-pinion steering system is received by a mounting member having mounting holes in alignment with bearing centers of the elastic bearings situated thereabove and with mounting openings in a cross-member arranged above the steering gear casing, with the lower ones of the bearing bodies disposed thereon, and with the assembled steering gear arranged thereon with the upper ones of the bearing bodies situated in the upper part of the bearing guides arranged to be boltable to the cross-member arranged thereabove by clamp bolts.

10. The mounting according to claim 9, wherein the clamp bolts are arranged to provide adjustability of the axial clamping of the damping elements of the two bearings to obtain predetermined bearing hardnesses.

\* \* \* \* \*